United States Patent [19]
Mann et al.

[11] Patent Number: 5,476,158
[45] Date of Patent: Dec. 19, 1995

[54] ROTOR TIME CONSTANT ADAPTATION FOR INDUCTION MOTOR IN VECTOR CONTROLLED ELEVATOR DRIVE

[75] Inventors: Michael Mann; Karl-Heinz Glahe, both of Berlin, Germany

[73] Assignee: Otis Elevator Company, Farmington, Conn.

[21] Appl. No.: 40,038

[22] Filed: Mar. 31, 1993

[51] Int. Cl.[6] ..................................................... B66B 1/24
[52] U.S. Cl. .......................................... 187/289; 318/807
[58] Field of Search .................................. 187/116, 119; 318/798, 799, 807, 809, 810, 812

[56] References Cited

U.S. PATENT DOCUMENTS

| | | | |
|---|---|---|---|
| 4,677,360 | 6/1987 | Garces | 318/803 |
| 4,885,519 | 12/1989 | Vogelmann | 318/800 |
| 5,076,399 | 12/1991 | Horbruegger et al. | 187/116 |
| 5,334,923 | 8/1994 | Lorenz et al. | 318/805 |

FOREIGN PATENT DOCUMENTS 56-86089  7/1981  Japan.

*Primary Examiner*—Steven L. Stephan
*Assistant Examiner*—Robert Nappi

[57] ABSTRACT

Torque current reference $I_{Tref}$ and reference acceleration $a_{ref}$ are sampled in a vector controlled induction motor drive for developing a quality criterion by which an estimated rotor time constant $\hat{\tau}_2$ may be adapted to the actual rotor time constant $\tau_2$. More specifically, the torque current reference $I_{Tref}$ and reference acceleration $a_{ref}$ are sampled and then a slope of $I_{Tref}$ versus $a_{ref}$ is plotted against the offset of that line, which offset is proportional to the lead torque $T_{LOAD}$. The no-load slope is then determined from this plot and subtracted from an ideal no-load slope and the difference passed through a proportional-integral circuit for providing an estimated rotor time constant $\hat{\tau}_2$ which is adapted to the actual rotor time constant $\tau_2$.

14 Claims, 8 Drawing Sheets

ROTOR TIME CONSTANT ADAPTATION FOR INDUCTION MOTOR IN VECTOR CONTROLLED ELEVATOR DRIVE

TECHNICAL FIELD

This invention relates to determination of a rotor time constant for use in a vector controlled induction motor.

BACKGROUND OF THE INVENTION

Today, many elevator drives with induction motors use the principle of vector control. Vector control leads to high dynamic behavior of the motor and therefore guarantees a good riding comfort and short flight times because the elevator velocity follows its reference value without any deviation.

To obtain the advantages of this control method, it is necessary to know the electrical parameters of the controlled motor. The main idea behind vector control is to control torque current independently from control of flux in the stator. This independence of control can only occur if the rotor time constant value used is correct. See "The Influence of Motor Parameter Deviations in Feedforward Field Orientation Drive Systems," K. B. Nordin, D. W. Novotny, D. S. Zinger, 1984 *IEEE* IAS84: 22B, p. 525. Unfortunately, the rotor time constant is not constant. It depends on the rotor resistance and therefore on the rotor temperature which varies according to the load conditions of the elevator. There exist many general algorithms to estimate the rotor time constant, but they are usually not suitable to elevator drives. Either these methods are very complicated and need expensive hardware or they use input and output values which are not available for elevator drives.

One class of algorithms uses special noise signals which are applied to the motor. The voltages and currents and the velocity of the motor are measured and the rotor time constant is calculated out of the measurement results. These algorithms are not suitable to elevators. It is not possible to feed the motor with noise signals because of the resulting jerk and poor riding comfort. See, for example, "Microprocessor Control of Induction Motor," R. Gabriel and W. Leonhard, *IEEE* 1982.

Another class of algorithms for estimating rotor time constant uses special operation modes, for example, idle running or special velocities which are not available for elevators. See, for example, "On the Identification of Induction Motor Parameters," M. Song, J. Mescua, Proc. of the 18th Southeastern Symposium on System Theory, *IEEE*, Knoxville, USA, April 1986.

See also "Self Commissioning—A Novel Feature of Modern Inverter-Fed Induction Motor Drives," H. Schierling, page 287, Proc. of Third International Conference on Power Electronics and Variable Speed Drive, *IEEE*, London, July, 1988. This reference discusses the use of stator voltage to determine rotor time constant. The problem, however, is that in elevators for reasons of cost, stator voltage is not usually measured and therefore these algorithms are useless.

DISCLOSURE OF THE INVENTION

The object of the present invention is to adapt an estimated rotor time constant $\hat{\tau}_2$ of a vector controlled induction motor to an actual rotor time constant The present invention is predicated first on the observation that the graph of motor torque $T_M$ against a torque reference $T_{ref}$ for a vector controlled induction motor is a line, ideally of slope 1, and second, that adjusting the estimated rotor time constant $\hat{\tau}_2$ fed into that vector controlled induction motor causes this line to rotate about the origin of that graph.

The third predicate for the invention is a conclusion that if the variation of the $T_M$ versus $T_{ref}$ line from the ideal 1:1 linear relationship can be determined, then that variation can be related to an estimated rotor time constant $\hat{\tau}_2$ which correspondingly varies from an actual rotor time constant $\tau_2$. Given this, the variation of the $T_M$ v. $T_{ref}$ line from the 1:1 relationship can be used to generate an estimated rotor time constant $\hat{\tau}_2$ which will have the effect of restoring the 1:1 linear relationship of $T_M$ versus $T_{ref}$.

To find how $T_M$ v. $T_{ref}$ varies, one must determine $T_M$ and $dT_{ref}$. Since $T_{ref}$ is dictated, only $T_M$ is left to obtain. Therefore the natural next step is to obtain $T_M$ by use of a $T_M$ sensor. Some savings in cost may be obtained, however, by attempting to determine $T_M$ without the use of a $T_M$ sensor. The fourth predicate for the invention is therefore the observation that:

$$T_M = A a_{ref} + T_{LOAD},\quad\text{(Equation 0)}$$

which provides the motor torque $T_M$ in terms of a more readily and cheaply available value, the reference acceleration $a_{ref}$, and in terms of the load torque $T_{LOAD}$. $T_{LOAD}$ is available only approximately, but this is sufficient since only the sign of the load torque $T_{LOAD}$ is necessary according to the present invention. Thus, how $T_{ref}$ varies with $T_M$ can be judged by how $I_{ref}$ varies with $A a_{ref} + T_{LOAD}$.

The fifth predicate for the invention is the observation that $T_{ref}$ is proportional to the torque current reference $I_{ref}$.

In sum therefore, the linear relationship between $T_M$ and $I_{ref}$ may be represented by the linear relationship between $I_{ref}$ and $a_{ref} + T_{LOAD}$. $T_{LOAD}$ may be obtained by measuring the torque current reference $I_{ref}$ when the motor speed $\omega_m$ is constant, for example zero, and there is no acceleration torque component in $I_{ref}$ when there is no acceleration torque, $T_{LOAD}$ is proportional to $I_{ref}$. Variation in the slope and offset of this line, $I_{ref}$ v $a_{ref}$, from the 1:1 relationship, is therefore also indicative of variation in the estimated rotor time constant $\hat{\tau}_2$ from the ideal rotor time constant $\tau_2$.

The sixth predicate of the invention is the observation that a graph of a slope of that line, $I_{ref}$ v. $a_{ref}$, against the offset of that same line (which offset is proportional to $T_{LOAD}$ since $a_{ref}$ is zero and there is therefore no acceleration torque $T_{ACCELERATION}$) reveals linear relationships between that slope and the estimated rotor time constant $\hat{\tau}_2$. When $T_{LOAD}$ is >0 and the elevator is accelerating in the up direction or decelerating in the down direction, a first unique linear relationship exists. A different unique linear relationship exists when $T_{LOAD}$ is <0 and the elevator is accelerating in the down direction or decelerating in the up direction. Therefore, the slope of $I_{ref}$ v. $a_{ref}$ can be used as a quality criterion for determining if the estimated rotor time constant $\hat{\tau}_2$ is well adapted to the actual rotor time constant $\tau_2$. That slope, at no load, is therefore subtracted from an ideal slope and the difference provided to a proportional-integral circuit for generating an estimated rotor time constant which will have the effect of restoring $T_M$ v. $T_{ref}$ to the ideal 1:1 linear relationship so important to a vector controlled motor.

According to the present invention, torque current reference $I_{ref}$ and reference acceleration $a_{ref}$ are sampled in a vector controlled induction motor drive for developing a quality criterion by which an estimated rotor time constant $\hat{\tau}_2$ may be adapted to the actual rotor time constant $\tau_2$. More specifically, the torque current reference $I_{ref}$ and reference acceleration $a_{ref}$ are sampled and then a slope of $I_{ref}$ versus $a_{ref}$ is plotted against the offset of that line, which offset is proportional to the load torque $T_{LOAD}$. The slope is then determined from this plot and subtracted from an ideal slope and the difference passed through a proportional-integral circuit for providing an estimated rotor time constant $\hat{\tau}_2$ which is adapted to the actual rotor time constant $\tau_2$.

Advantages of the present invention include:

(a) good riding comfort and short flight times because of well-adapted vector control;
(b) rotor time constant is obtained without the need for measuring stator voltage;
(c) the algorithm works on line, no additional time delay which could lengthen the flight time is needed; and
(d) only a little additional computation time during a run is needed for sampling $I_{ref}$ and $a_{ref}$; most calculations are done during standstill.

BRIEF DESCRIPTION OF THE DRAWING

FIG. 15 is a graph of tangent $\phi$ v. stator frequency $\omega$.

BEST MODE FOR CARRYING OUT THE INVENTION

Abbreviations

Figure 1:
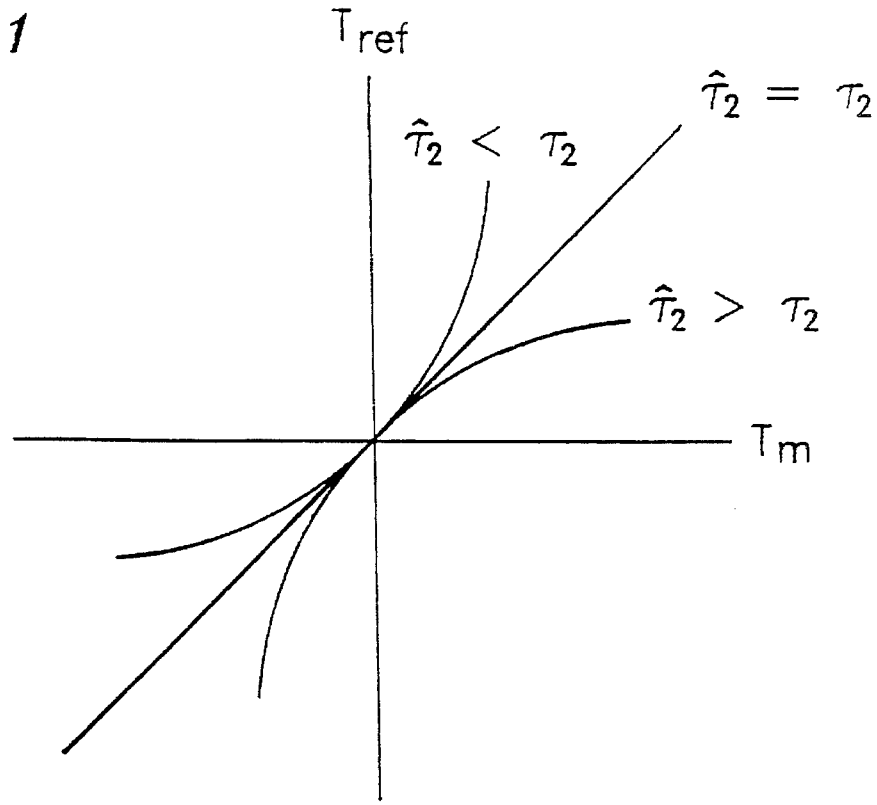
FIG. 1 is a graph of $T_{ref}$ v. $T_m$.

A subscript of 1 denotes a stator value. A subscript of 2 denotes a rotor value.

| | |
|---|---|
| $a_{ref}$ | acceleration reference |
| IM | induction motor |
| â | = $\tau_2/\hat{\tau}_2$ |
| ü | gear ratio for an elevator drive |
| $r_T$ | radius of elevator drive sheave |
| P | 2P is the number of poles of the induction motor |
| J | rotational inertia of drive |
| kv | ü/$r_T$ |

-continued

| | |
|---|---|
| k | $3PL_H/(2L_2)$ |
| $Z(\omega)$ | complex stator impedance |
| T | period of stator current |
| $X(\omega)$ | imaginary part of stator impedance |
| $\phi$ | angle between stator current, voltage |
| $I_{Tref}$ | torque current reference |
| $i_{flux}$ | flux current reference |
| $i_{1\alpha}$ | stator current components in synchronous rotating coordinates |
| $i_{1\beta}$ | stator current components in synchronous rotating coordinates |
| $i_{1a}$ | stator current |
| $i_{1b}$ | stator current |
| $i_{TSTAT}$ | static current component of torque current |
| $i_{TDYN}$ | dynamic current component of torque current |
| $L_H$ | inductance in an induction motor equivalent circuit |
| $L_1$ | stator inductance |
| $L_2$ | rotor inductance |
| $L_\sigma$ | total leakage inductance |
| $L_{1\sigma}$ | stator leakage inductance |
| $L_{2\sigma}$ | rotor leakage inductance |
| $L_R$ | $L_H^2/R_2$ |
| $L_H$ | main inductance |
| $R(\omega)$ | real part of stator impedance |
| $R_1$ | stator resistance |
| $R_2$ | rotor resistance |
| $T_m$ | motor torque |
| $T_{ref}$ | torque reference |
| $T_{LOAD}$ | load torque |
| $U_{1a}$ | stator voltage |
| $U_{1b}$ | stator voltage |
| $\dot{\omega}_m$ | derivative of motor speed |
| $\omega_m$ | motor speed (rotational) |
| $\omega_{ref}$ | reference motor speed |
| $\omega_1$ | stator frequency |
| $\omega$ | fundamental frequency of stator voltage |
| $\omega_2$ | slip frequency |
| $\Psi_{2b}$ | stator flux |
| $\Psi_{2a}$ | stator flux |
| $\Psi_{2\alpha}$ | rotor flux |
| $\tau_2$ | real rotor time constant |
| $\hat{\tau}_2$ | estimated rotor time constant |

A. GENERAL PRINCIPLES

If the parameters of a vector control for an IM are set to ideal values and if we assume a high-performance, dynamic, premium servomechanism, then the motor torque $T_m$ will always coincide with the reference torque $T_{ref}$ demanded by the vector control. So in the ideal case, we have:

$$T_m = T_{ref} \quad \text{(Equation 1)}$$

The essential prerequisite for this ideal behavior, in addition to an optimally set current control loop with the smallest possible controller error, is a precise knowledge of the present value of the rotor time constant $\tau_2$.

If we plot the reference torque $T_{ref}$ against the motor torque $T_m$, then in the ideal adaptation case we obtain a curve for Equation (1) beginning at the origin and having a slope of 1. See FIG. 1.

In case of incorrect adaptation of the estimated rotor time constant $\hat{\tau}_2$ to the rotor time constant $\tau_2$, $\hat{\tau}_2 \neq \tau_2$, the actual profile of the function $T_{ref} = f(T_m)$ differs from this linear behavior. The fundamental behavior of this function in an incorrect adaptation is presented in FIG. 1.

From FIG. 1 it is evident that with decreasing values for the estimated rotor time constant $\hat{\tau}_2$ in the velocity controller ($\hat{\tau}_2 < \tau_2$), the reference torque $T_{ref}$ calculated by a velocity controller (not shown), will increase superproportionally and reach a given motor torque $T_m$. A direct evaluation of the relationship $T_{ref} = f(T_m)$ for purposes of adaptation is not possible, however, since the torque $T_m$ on an elevator system is not readily available as a measured parameter. However, an indirectly measured parameter, the angular acceleration $\omega_m$, which can be determined from a measurement of the velocity $\omega_m$ of the machine (by means of an incremental shaft encoder) is available. The relationship between angular acceleration $\omega_m$ and torque $T_m$ is given by the following equation (provided we neglect the friction):

$$T_m = J\omega_m + T_{LOAD} \Leftrightarrow \omega_m = (T_m - T_{LOAD})/J \quad \text{(Equation 2)}$$

According to Equation (2), the angular acceleration $\omega$ runs linearly with $T_m$. The angular acceleration $\omega$ can thus be used as a measure for the torque $T_m$ of the machine. Now assuming that the error between the reference velocity and the actual velocity is small, then the numerically unfavorable differentiation of $\omega$ can be replaced by the approximation $\omega \approx \omega_{ref}$. Now here, $\omega_{ref}$ is the reference angular acceleration of the IM.

Now if we begin from an ideal adaptation ($\hat{\tau}_2 = \tau_2$), then ($T_m = T_{ref}$). The relation between $\omega \approx \omega_{ref}$ and $T_{ref}$ is given according to Equation (2) by $$T_{ref} = J\omega_{ref} + T_{LOAD} \quad \text{(Equation 3)}$$

The graph of the function $T_{ref} = f(\omega_{ref})$ is a line with slope J and offset $T_{LOAD}$. If the assumption of ideal adaptation $\hat{\tau}_2 = \tau_2$ is not met, then the same statements made for FIG. 1 will apply accordingly. Only the slope and the offset of the line will change.

Figure 2:
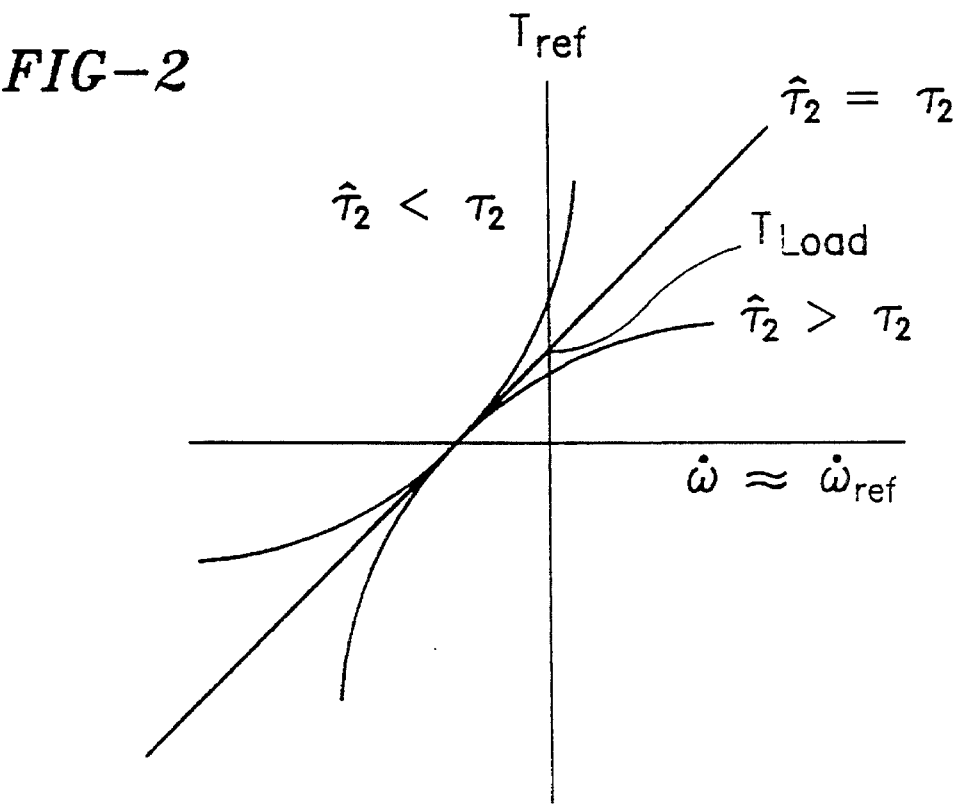
FIG. 2 is a graph of $T_{ref}$ v. $\omega_{ref} \approx \omega$.

FIG. 2 shows the fundamental relation between $\omega_{ref}$ that is used as a measure for the torque of the IM and the reference torque $T_{ref}$ for deviations in the estimated rotor time constant $\hat{\tau}_2$ in the velocity controller from its ideal value $\tau_2$.

Instead of $T_{ref}$ and $\omega_{ref}$, in our discussion below, the quantities $I_{ref}$ and $a_{ref}$ are used as internal parameters of the control system. The translational, reference acceleration $a_{ref}$ corresponds to the reference angular acceleration $\omega_{ref}$, except for a constant factor ($a_{ref} = \omega_{ref} * r_T/\ddot{u}$); likewise the reference value of the torque-forming stator current component $I_{ref}$ is proportional to $T_{ref}$. The torque current reference $I_{ref}$ can be broken into a static part $I_{Tstat}$ that is proportional to the load torque $T_{LOAD}$ and into a dynamic part $I_{TDYN}$ that is proportional to the acceleration torque $T_{ACCELERATION}$ or to the reference acceleration $a_{ref}$.

Figure 3:
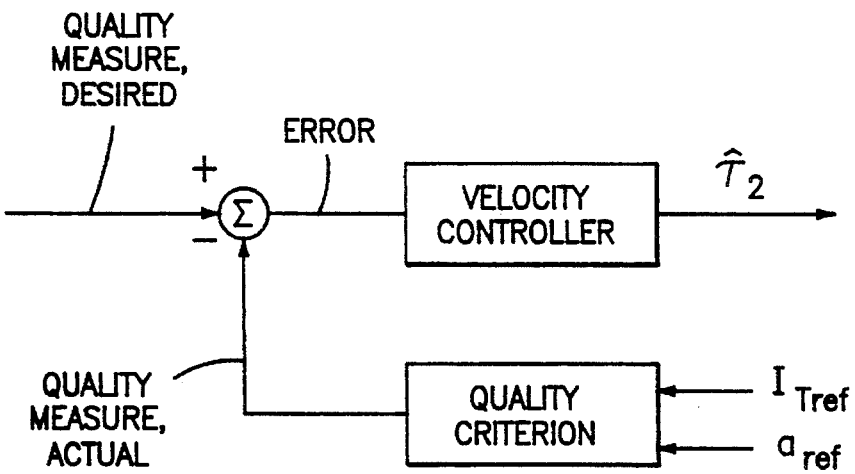
FIG. 3 is a block diagram of the invention.

The relationship between $I_{ref}$ and $a_{ref}$ shows how much the actual value of the rotor time constant $\tau_2$ of the machine coincides with the estimated value $\hat{\tau}_2$ in the velocity controller. A quality criterion is developed below that provides a measure for the tuning of $\hat{\tau}_2$ through evaluation of the quantities $I_{ref}$ and $a_{ref}$. A structural figure for the potential implementation of an adaptation method is shown in FIG. 3.

Evaluation of the Current-Acceleration Relation

The function $I_{ref} = f(a_{ref})$ can be approximated in the environs of a suitable working point (e.g., in the vicinity of $a_{max}/2$) by a linear equation:

$$\text{with } I_{ref} \approx A a_{ref} + B \text{ with } B \approx T_{LOAD} \quad \text{(Equation 4)}$$

The factor A, the slope of the above line, is the amplification factor between the reference acceleration $a_{ref}$ and the reference value of the current $I_{ref}$ for small changes about the selected operating point. The offset B depends on the static load torque $T_{LOAD}$, but only if $\tau_2 = \hat{\tau}_2$ is B proportional to $T_{LOAD}$. "A" is therefore evidently a function of the tuning of the rotor time constant $\hat{\tau}_2$ of the velocity controller. As a measure for this tuning, we define the ratio $v = \tau_2/\hat{\tau}_2$. The relationship:

$$\text{with } A = f(v) \quad \text{(Equation 5)}$$

will be examined quantitatively below.

Theoretical Investigation of the Profile of $I_{ref}$, $a_{ref}$

A general relation=between $a_{ref}$ and $I_{ref}$ is obtained from the equation of motion of the system. For the acceleration torque $T_{ACCELERATION}$ we have:

$$T_{ACCELERATION}(t) = T_m(t) - T_{LOAD} = Jk_v \frac{d}{dt} v(t) \quad \text{(Equation 6)}$$

with $k_v = \ddot{u}/r_T$ $T_{ACCELERATION}(t) = Jk_v a(t)$

The pertinent part of the torque of the induction motor (equivalent circuit shown in FIG. 4) in the case of ideal adaptation ($\hat{\tau}_2 = \tau_2$) takes on the value $$T_m(t) = k i_{1\alpha}(t) i_{1\beta}(t) \quad \text{with } k = p \frac{3L_H^2}{2L_2} \quad \text{(Equation 7)}$$

Under the additional assumption of an ideal, dynamic behavior of the velocity control, the actual values for currents and acceleration torque can be replaced by their reference values in the above equations.

From Equations (6) and (7) we then obtain the following equation for the 'dynamic' current component $I_{TDYN}$ (see Equation (3)):

$$i_{1\beta dyn}(t) = A a_{ref}(t) \text{ with } A = J * k_v/(K * I_{flux}) \text{ for } \hat{\tau}_2 = \tau_2 \quad \text{(Equation 8)}$$

The 'static' current component $I_{Tstat}$ is obtained directly from the current-torque relation in Equation (7) as:

$$I_{Tstat} = T_{LOAD}/(k I_{flux}) = B$$

As a whole, the current $I_{ref}$ can be calculated in the case of $\hat{\tau}_2 = \tau_2$ as $$I_{Tref} = I_{TDYN} + I_{Tstat} = \frac{Jk_v}{kI_{flux}} a_{ref} + \frac{T_{LOAD}}{kI_{flux}} = A a_{ref} + B \quad \text{(Equation 9)}$$

The expression $kI_{flux}$ in the denominator of factor A can also be interpreted as a differential amplification factor of the torque-current relation. Now if we pass over to the case of an incorrect adaptation ($\hat{\tau}_2 \tau_2$), where the prefactor A of $a_{ref}$ is no longer constant, then the Equation (9) with $$\partial T_m/\partial I_{ref} = kI_{flux}$$

can be written as $$I_{Tref} \approx \frac{Jk_v}{\left.\frac{T_m}{I_{Tref}}\right|_{AP}} a_{ref} + I_{Tstat}$$

AP is the operating point where the partial derivative of the motor torque $T_m$ is calculated. At the operating point, the average value of the 'dynamic' current component iTDyN can be used. The factor A from Equation (4) thus can be calculated with the relation:

$$A \approx \frac{Jk_v}{\left.\frac{T_m}{I_{Tref}}\right|_{AP}} \quad \text{(Equation 11)}$$

To be able to evaluate the influence of the tuning of the rotor time constant $\tau_2$ on A, a generalized torque-current relation will have to be derived that will take into account the influence of the incorrect adaptation to the torque $T_m$.

Generalized Current-Torque Equation

Proceeding from the general torque equation for the machine in rotor-flux related coordinates:

$$T_m = k i_{1\alpha} i_{1\beta} \text{ with } k = p(3L_h^2/2L_2) \quad \text{5}$$

and the relation between the slip frequency $\omega_2$ and the components $i_{1\beta}$ and $i_{1\alpha}$ of the stator current $i_1$.

$$i_{1\beta}/i_{1\alpha} = \omega_2 \tau_2 \text{ for } \psi_{2\alpha} = \text{const.}$$

the torque can be calculated as:

$$T_m = k \omega_2 \tau_2 \, i_{1\alpha}^2 \quad \text{(Equation 12)}$$

The velocity controller specified the slip frequency $\omega_2$ of the machine according to the equation:

$$\omega_2 = \frac{1}{\hat{\tau}_2} \frac{I_{Tref}}{I_{flux}} \quad \text{(Equation 13)}$$

Thus the torque of the speed-controlled machine becomes:

$$T_m = k(\tau_2/\hat{\tau}_2)(I_{ref}/I_{flux}) \, i_{1\alpha}^2 \quad \text{(Equation 14)}$$

In order to be able to determine $T_m$ exclusively from the reference values of the currents $i_{1\alpha s}$ and $i_{1\beta s}$ and also the measure for the tuning of the rotor time constant $\tau_2$ in the velocity controller $v = \tau_2/\hat{\tau}_2$, the current $i_{1\alpha}$ in Equation (14) must be substituted by $I_{ref}$ and $I_{flux}$.

Figure 5:
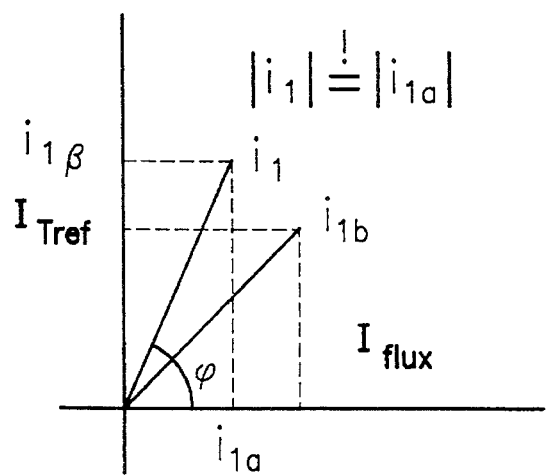
FIG. 5 is a graph of $I_{ref}$ v. $I_{flux}$.

From the vector diagram in FIG. 5 and with the assumption that the amounts of the reference and actual value of the stator current are identical ('fast' current control and rectifier) from the base equation:

$$\tan \phi = \omega_2 \tau_2$$

and also the Equation (13) for the reference slip of the machine for $\tan \phi$, we arrive at the expression:

$$\tan \phi = \tau_2/\hat{\tau}_2 \, (I_{ref}/I_{flux}) \quad \text{(Equation 15)}$$

From FIG. 5 we obtain the following expression for the component $i_{1\alpha}$ to be substituted:

$$i_{1\alpha} = \cos \phi \sqrt{I_{flux}^2 + I_{Tref}^2}$$

With the substitution $$\cos \phi = \sqrt{\frac{1}{1 + \tan^2 \phi}}$$

and Equation (15) for $I_{flux}$ we then have:

$$i_{1\alpha} = \sqrt{I_{flux}^2 + I_{Tref}^2} \bigg/ \sqrt{1 + (\tau_2/\hat{\tau}_2)^2 \, I_{Tref}^2/I_{flux}^2}$$

Equation (14) thus can be written as:

$$T_m = k(\tau_2/\hat{\tau}_2) \frac{I_{Tref}(I_{flux}^2 + I_{Tref}^2)}{I_{flux}(1 + (\tau_2/\hat{\tau}_2)^2 I_{Tref}^2/I_{flux}^2)}$$

After several transformations we then obtain the final form of the current-torque relation:

$$T_m = k(\tau_2/\hat{\tau}_2) \frac{I_{flux} I_{Tref}(I_{flux}^2 + I_{Tref}^2)}{I_{flux}^2 + (\tau_2/\hat{\tau}_2)^2 I_{Tref}^2}$$

Now if the velocity controller is adapted at the optimum level, then $\tau_2 = \hat{\tau}_2$ and Equation (16) becomes $$T_m = k I_{flux} I_{Tref}$$

Proposal for a Quality Criterion

The influence of the tuning of the estimated rotor time constant $\hat{\tau}_2$ on the slope of the branches of the characteristic line of $T_m = f(I_{ref}, \tau_2/\hat{\tau}_2)$ cannot be used directly as a criterion for the adaptation status of the system, if the torque $T_m$ is not available as a measured quantity. However, with Equation (11) an indirect evaluation of this effect is possible by means of the relationship between the reference acceleration $a_{ref}$ and the reference current value $I_{Tref}$, both of which are available as internal parameters of the control system. The factor A represents the slope, or more precisely, the amplification factor of the function $I_{Tref} = f(a_{ref})$ at the working point AP.

After calculation of the partial derivative $$\partial T_m / \partial I_{Tref}$$

we obtain the following expression for A:

$$A(I_{Tref}, \tau_2/\hat{\tau}_2) = \frac{J k_v}{k(\tau_2/\hat{\tau}_2) \times \dfrac{I_{flux}(I_{flux}^4 - (\tau_2/\hat{\tau}_2)^2 I_{flux}^2 I_{Tref}^2 + 3 I_{flux}^2 I_{Tref}^2 + (\tau_2/\hat{\tau}_2)^2 I_{Tref}^4)}{I_{flux}^4 + 2(\tau_2/\hat{\tau}_2)^2 I_{flux}^2 I_{Tref}^2 + (\tau_2/\hat{\tau}_2)^4 I_{Tref}^4}}$$

For the case of ideal adaptation $\hat{\tau}_2 = \tau_2$, Equation (17) reduces into the already known expression for A:

$$A = J k_v/(k I_{flux}) = \text{const.}$$

from Equation (8).

B. IMPLEMENTATION

A simpler explanation of the invention with less mathematics is presented along with a structure for implementation of the invention. Although the above explanation may provide greater accuracy, it does so at the cost of greater processing overhead than the scheme described below.

Figure 6:
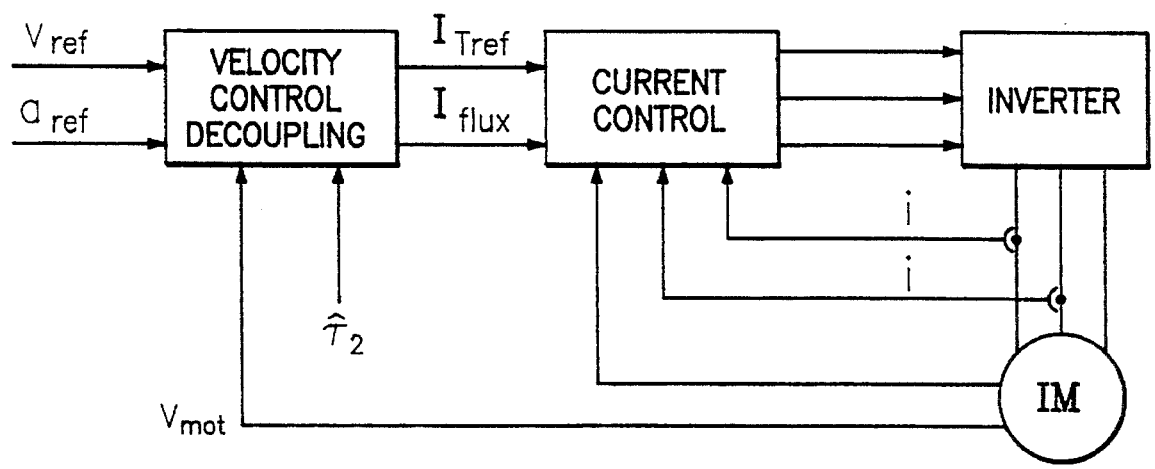
FIG. 6 is a block diagram of a vector controlled induction motor.

FIG. 6 is a block diagram of a vector controlled induction motor. A velocity control is responsive to a velocity reference, an acceleration reference, the actual velocity of the induction motor as provided by a tachometer, and the time constant of the induction motor rotor. The velocity control serves to control the velocity of the induction motor by providing a torque current reference and a flux command and controlling these two independent of one another. The torque current reference $I_{Tref}$ and flux command $I_{flux}$ are the two components of the stator current. These two are provided to the stator current control. The stator current control is responsive to two of the three phase stator currents $I_u$, $I_v$ and the measured rotor angle Phi and provides three phase stator voltage references $U_u$, $U_v$, $U_w$ to an inverter. The inverter provides in response three phase stator current to the induction motor $I_u$, $I_v$, $I_w$.

Ideally, the relationship between the motor torque $T_m$ and $T_{ref}$ is linear and 1:1. See FIG. 1. In practice, this is not the case. It is observed that if the estimated rotor time constant $\hat{\tau}_2$ value is varied and corresponding values of motor torque $T_m$ and torque reference $T_{ref}$ are measured, the line $T_m$ v. $T_{ref}$ is found to rotate. One can conclude therefore that if the variation of the $T_m$ v. $T_{ref}$ line from the ideal 1:1 linear relationship can be determined, then that variation can be related to an estimated rotor time constant $\hat{\tau}_2$ which correspondingly varies from an ideal rotor time constant $\tau_2$. Given this, the variation between the measured $T_m$ v. $T_{ref}$ line and the 1:1 relationship can be used to generate an estimated rotor time constant $\hat{\tau}_2$ which will have the effect of restoring the 1:1 linear relationship of $T_m$ v. $T_{ref}$.

To find how $T_{ref}$ v. $T_m$ varies, one must determine $T_m$ and $T_{ref}$. Since $T_{ref}$ is dictated, only $T_m$ is left to obtain. And therefore, the natural next step is to obtain $T_m$ by use of $T_m$ sensor. Some savings in cost may be obtained, however, by attempting to determine the motor torque $T_m$ without the use of a $T_m$ sensor. It is observed that:

$$T_m = A a_{ref} + T_{LOAD}, \quad \text{(Equation 18)}$$

which provides the motor torque $T_m$ in terms of two more readily and cheaply available values, $a_{ref}$ and $T_{LOAD}$. Thus, how $T_{ref}$ varies with $T_m$ can be judged by how $T_{ref}$ varies with $Q a_{ref} + T_{LOAD}$. It is further observed that $T_{ref}$ is proportional to the torque current reference $I_{ref}$. In sum, therefore, the linear relationship between $T_m$ and $T_{ref}$ may be represented by the linear relationship between $I_{ref}$ and $a_{ref} + T_{LOAD}$. $T_{LOAD}$ may be obtained by measuring the torque current reference $I_{ref}$ when the motor speed is constant, for example zero, and there is no acceleration torque component in the torque current reference $I_{ref}$. When there is no acceleration torque, the load torque $T_{LOAD}$ is proportional to the torque current reference $I_{ref}$ because the only torque needed is to account for load torque $T_{LOAD}$. No acceleration torque $T_{ACCELERATION}$ is needed at constant speed. Variation in the slope and offset of this line is therefore also indicative of variation in the estimated rotor time constant $\hat{\tau}_2$ from the ideal rotor time constant $\tau_2$. See FIG. 7.

Figure 7:
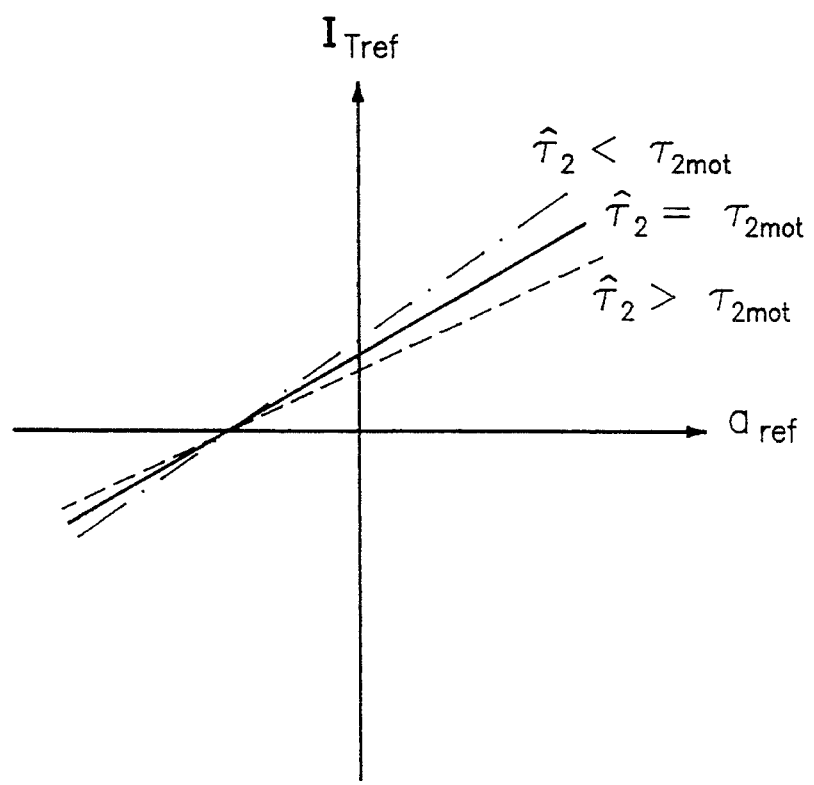
FIG. 7 is a graph of $I_{ref}$ v. $a_{ref}$.

The line in FIG. 7 rotates depending on the selection of an estimated rotor time constant $\hat{\tau}_2$, just as the line $T_m$ v. $T_{ref}$ rotates (see FIG. 1). The offset B in FIG. 7 is equal to the value of the torque current reference $I_{ref}$ at no acceleration and therefore, no acceleration torque. This offset B is proportional to the load torque $T_{LOAD}$ only if $\hat{\tau}_2 = \tau_2$ as in Equation (4). Nevertheless, B has the same sign as $T_{LOAD}$. See Equation (16) and Equation (9) with $a_{ref} = 0$ with $T_m = T_{LOAD}$. If $\hat{\tau}_2 = \tau_2$, then $T_{LOAD} = K I_{flux} I_{ref}$ and $I_{ref} = B$.

Figure 8:
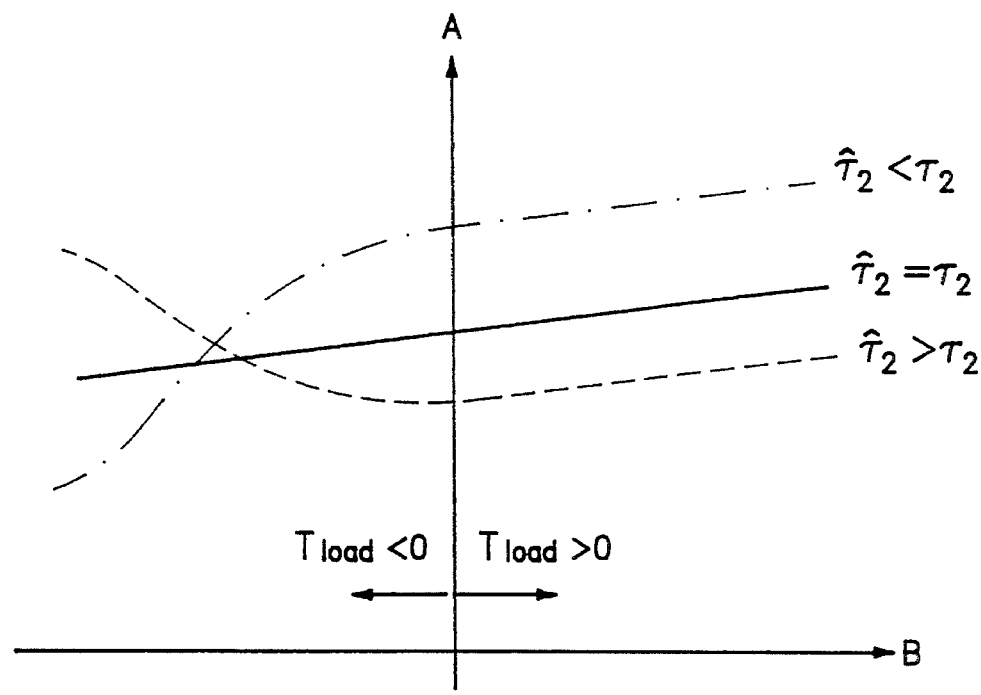
FIG. 8 is a graph of A v. B.
Figure 9:
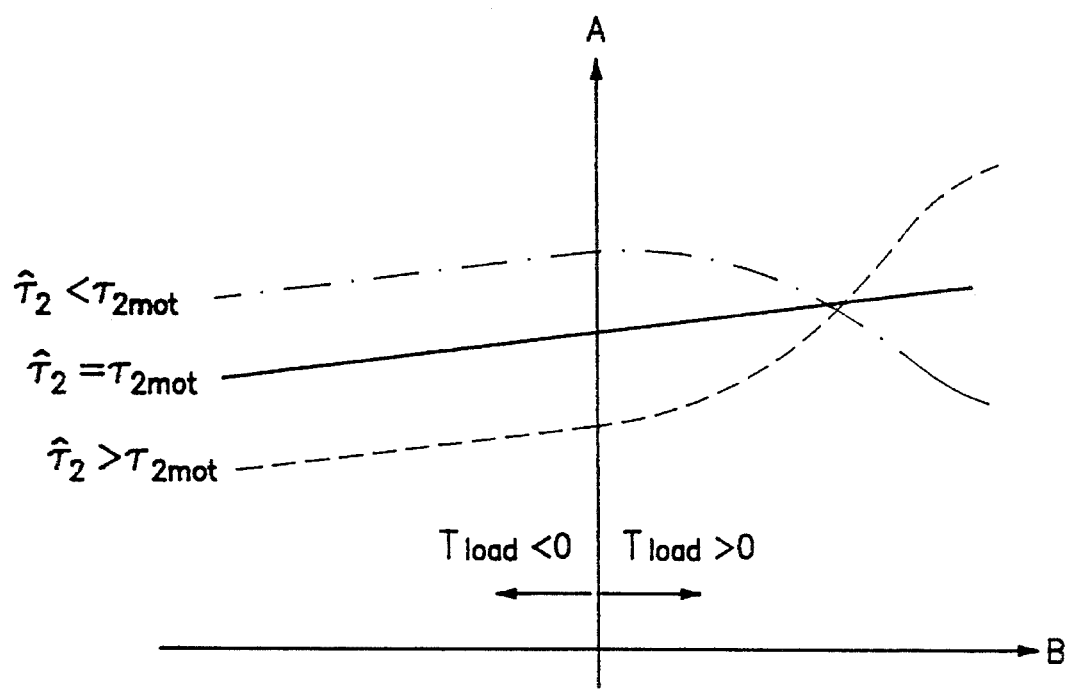
FIG. 9 is a graph of A v. B.

If the slope A of the line in FIG. 7 is plotted against its offset B, graphs in FIGS. 8 and 9 result. This slope A is the same slope A of Equation (4). FIG. 8 is a graph of slope A v. offset B during acceleration up or deceleration down runs of the car for various values of estimated rotor time constant $\hat{\tau}_2$. FIG. 9 is a graph of slope A v. offset B during acceleration down or deceleration up for various values of the rotor time constant $\hat{\tau}_2$. In FIG. 8 where the load torque $T_{LOAD}$ is greater than zero, the relationship between the estimated rotor time constant $\hat{\tau}_2$ and the slope A is unique. In FIG. 9, for load torque $T_{LOAD}$ less than zero, the relationship between slope A and estimated rotor time constant $\hat{\tau}_2$ is unique. The relationship between slope A and offset B is:

$$A_1 = A_0 + C_1 B \quad \text{(Equation 19)}$$

where load torque $T_{LOAD}$ is greater than zero, and $$A_2 = A_0 + C_2 B \quad \text{(Equation 20)}$$

where the load torque $T_{LOAD}$ is less than zero;

where $A_1$ is the slope of the line in FIG. 7 for acceleration up and deceleration down, and $A_2$ is the slope of the line in FIG. 7 for acceleration down and deceleration up;

$A_0$ is the slope of the line in FIG. 7 for ideal adaptation of the estimated rotor time constant; $\hat{\tau}_2 = \tau_2$; and $C_1$, $C_2$ are the slopes of the linear portions of the lines in FIGS. 8 and 9, respectively.

$C_1$, $C_2$ are related to the inertia of the drive system (rotational inertia) which is related to A in the above Equation (0). That is, $T = J\, d\omega r/dt + T_{LOAD}$ (rotational), where J is the rotational inertia of the motor drive system. This second equation is the general case of Equation (0). A and J are not equivalents because $a_{ref}$ and $d\omega jr/dt$ are not equivalent. As $C_1$, $C_2$ are proportional to the rotational inertia of the induction motor, they are, as one would expect, approximately equal.

It is observed that a graph of a slope of that line $I_{Tref}$ v. $a_{ref}$ in FIG. 6 against the offset of that line is yet another line which reveals one unique relationship between that slope and the estimated rotor time constant $\hat{\tau}_2$ when the load torque is greater than zero, acceleration up or deceleration down, and another unique relationship when the load torque is less than zero, acceleration down or deceleration up. Therefore, the slope A can be used as a criterion for determining if the estimated rotor time constant $\hat{\tau}_2$ is well-adapted to the actual rotor time constant $\tau_2$. That slope $A_0$ is therefore subtracted from an ideal $A_{0,ideal}$ and the difference provided to a proportional-integral circuit for generating an estimated rotor time constant $\hat{\tau}_2$ which will have the effect of restoring $T_m$ v. $T_{ref}$ to the ideal 1:1 linear relationship.

Figure 10:
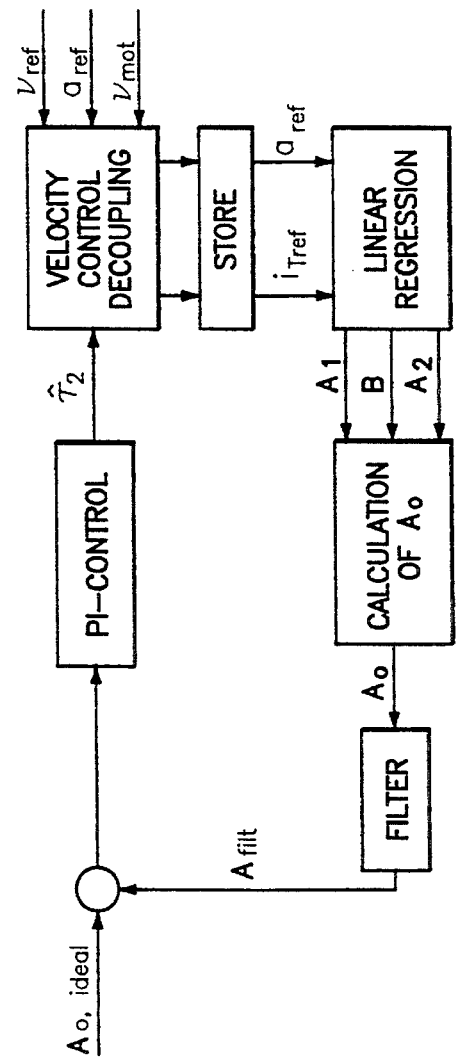
FIG. 10 is a block diagram disclosing the invention.

FIG. 10 shows how to implement the invention. A velocity control functionally similar to the one in FIG. 6 is responsive to a voltage reference, an acceleration reference, the velocity of the motor, and the estimated rotor time constant for controlling the two components of the stator current responsible for flux and torque independently. The velocity controller works with a ten-millisecond clock for sampling the acceleration reference and calculating a corresponding torque current reference $I_{Tref}$. This is the only portion of the invention which must be performed during an elevator run.

The sampled torque current reference $I_{Tref}$ and acceleration reference $a_{ref}$ values are stored until provided to a linear regression block which computes the slope A and offset B of the linear relationship between $I_{Tref}$ and $a_{ref}$. $A_1$ is the slope during an elevator run, acceleration up or deceleration down. $A_2$ is the slope during an elevator run, acceleration down or deceleration up. B is the same for both acceleration and deceleration. The linear regression block provides $A_1$, $A_2$ and B to a block for calculating the no-load slope of the $I_{Tref}$ v. $a_{ref}$ line. This block first decides whether the acceleration or deceleration quality criterion is to be used according to FIGS. 8 and 9. The table shows the possible combinations of sign of B (= to sign of load torque $T_{LOAD}$), direction of run of the elevator and samples of acceleration reference and torque current reference were taken, acceleration or deceleration phase, and slope used.

| Sign (B) | Direction | Phase Used | Slope Used |
|---|---|---|---|
| + | up | acceleration | A1 |
| − | up | deceleration | A2 |
| + | down | deceleration | A2 |
| − | down | acceleration | A1 |

This block then calculates $A_0$ out of the above Equations (19) and (20). The multipliers $C_1$ and $C_2$ are not given from the linear regression block or the block for calculating $A_0$ from $A_1$, $A_2$ and B. These are obtained on installation as is explained below. $A_0$ is next provided to a digital filter for noise suppression. The type of digital filter is discussed in Philips "Digital Control Systems Analysis and Design," Chapter 12. Next, the actual slope $A_0$ of the line $I_{Tref}$ V. $a_{ref}$ is subtracted from an ideal value $A_{0,ideal}$ obtained on installation as explained below, corresponding to the actual value of the rotor time constant. The difference is provided to a proportional-integral controller of a type described in the above text, Chapter 8. If the difference from the summer is negative, then the estimated rotor time constant $\hat{\tau}_2$ is too small and the initial value of the estimated rotor time constant $\tau_2$ provided from the proportional-integral controller is increased, and vice versa. By increasing or decreasing the estimated rotor time constant $\hat{\tau}_2$, the effect is to restore $T_m$ v. $T_{ref}$ to 1:1, allowing independent control of the flux and torque by the vector control in FIG. 6.

Figure 11:
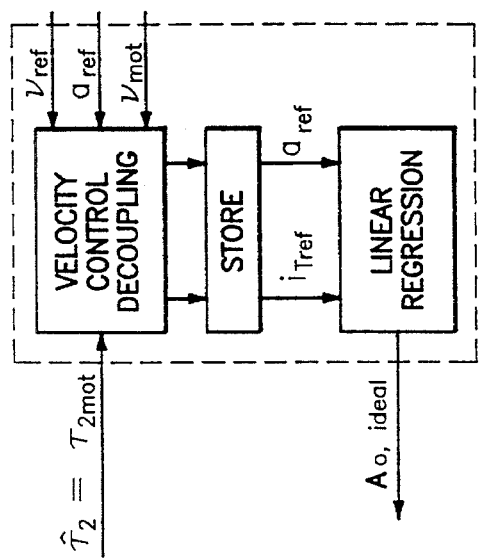

Initialization (at time of installation) of the present invention involves determining $C_1$, $C_2$, and $A_{0,ideal}$. FIG. 11 is a block diagram of an apparatus for determining $A_{0,ideal}$. First, the load torque $T_{LOAD}$ is set to zero, that is, the cabin weight and load in the car balance the counterweight. The estimated rotor time constant $\hat{\tau}_2$ is set to the actual value $\tau_2$, for example, by using an induction motor identification algorithm. This actual value may be obtained in a self-commissioning procedure as shown in "Self-commissioning—A Novel Feature of Modern Inverter-fed Induction Motor Drives", H. Schierling, page 287, Proc. of Third International Conference on Power Electronics and Variable Speed Drive, *IEEE*, London, July, 1988. The car is sent on a run and the torque current reference $I_{Tref}$ and acceleration reference $a_{ref}$ are sampled. Since B is zero, there is no difference between Equations (19) and (20) above and A0,ideal is provided from the linear regression block.

Figure 12:
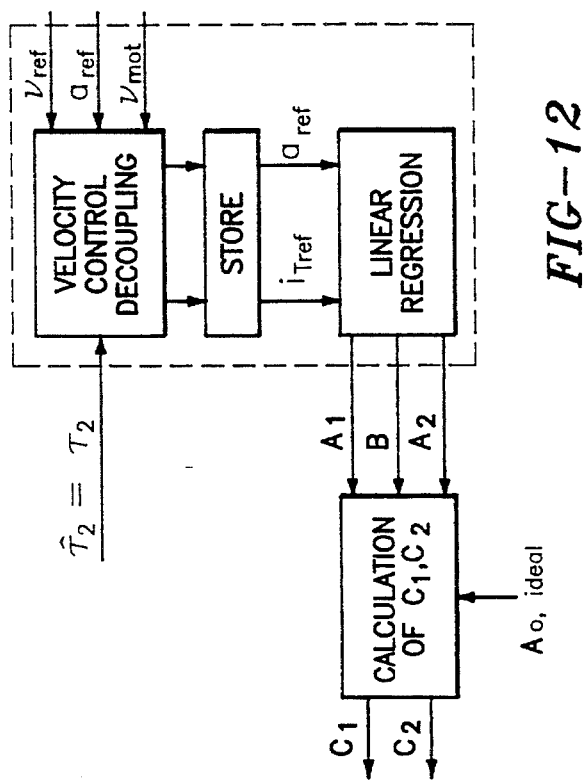
FIGS. 11 and 12 are block diagrams of circuits used in an initialization scheme.

FIG. 12 is a block diagram of the vector control under ideal adaptation of the estimated rotor time constant $\hat{\tau}_2$ to the ideal value $\tau_2$. Two initialization runs are taken: empty car running up, that is, with the load torque less than zero for determining $C_2$ and empty car down, that is, load torque greater than zero, for determining $C_1$. The torque current reference $I_{Tref}$ and acceleration references $a_{ref}$ are sampled and $A_1$, $A_2$, and B are provided to the calculating block, along with $A_{0,ideal}$ for providing $C_1$, $C_2$:

$$C_1 = (A_1 - A_{0,ideal})/B \qquad \text{(Equation 21)}$$

where the load torque $T_{LOAD}$ is greater than zero;

$$C_2 = (A_2 - A_{0,ideal})/B \qquad \text{(Equation 22)}$$

where the load torque $T_{LOAD}$ is less than zero.

Figure 13A:
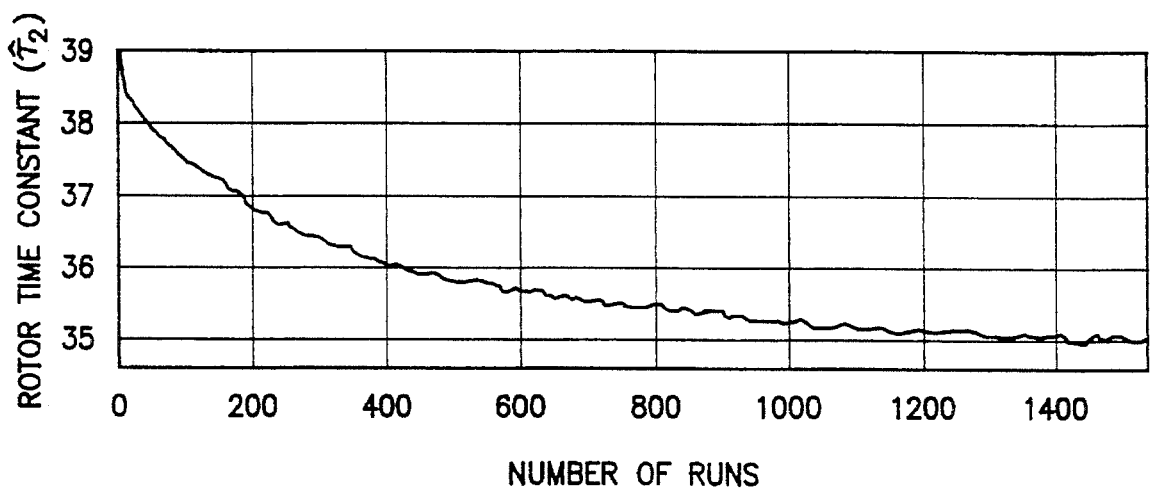
FIGS. 13A and 13B are respectively graphs of estimated rotor time constant $\hat{\tau}_2$ and stator temperature (C.) v. number runs of elevators.
Figure 13B:
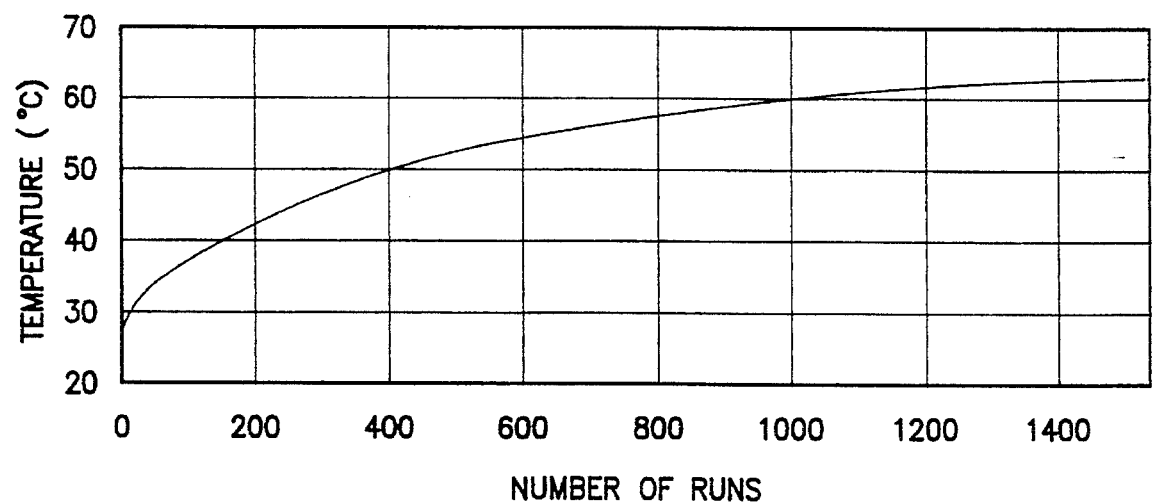

FIG. 13 shows measured results with the estimated rotor time constant $\hat{\tau}_2$ and stator temperature plotted against the number of runs. Because the rotor time constant $\hat{\tau}_2$ is proportional to the rotor temperature, this diagram is a good proof that the invention estimates the correct rotor time constant. The stator temperature is, in the steady state, the same as the rotor temperature. In addition, for an increasing or decreasing rotor temperature, the stator temperature can be taken as a good reference for the behavior of the rotor temperature.

An induction motor identification algorithm which is alternative to the Schierling one above is as follows:

C. INDUCTION MACHINE PARAMETER IDENTIFICATION

1. Machine Model

The identification algorithm is based on an induction motor model which is a little different from a conventional one as described in "Control of Electrical Drives", W. Leonhard, Springer-Verlag (Springer Publishing), Berlin, Heidelberg, New York, Tokyo, 1985. The following equations show the model used for this invention. It describes an induction motor at standstill in stator fixed coordinates using a coordinate system with the axes (a) and (b), where (a) equals one motor phase R for a three-phase motor having lines R, S, T.

$$\frac{d}{dt}\begin{pmatrix} L_\sigma i_{1a} \\ \psi_{2a} \end{pmatrix} = \begin{pmatrix} -R_1 - L_R/\tau_2^2 & \\ & L_R/\tau_2^2 \end{pmatrix}\begin{pmatrix} i_{1a} \\ \psi_{2a}' \end{pmatrix} + \begin{pmatrix} u_{1a} \\ 0 \end{pmatrix} \qquad \text{(Equation 23)}$$

$$\frac{d}{dt}\begin{pmatrix} L_\sigma i_{1b} \\ \psi_{2b}' \end{pmatrix} = \begin{pmatrix} -R_1 - L_R/\tau_2^2 & 1/\tau_2 \\ L_R/\tau_2^2 & -1/\tau_2 \end{pmatrix}\begin{pmatrix} i_{1b} \\ \psi_{2b}' \end{pmatrix} + \begin{pmatrix} u_{1b} \\ 0 \end{pmatrix} \qquad \text{(Equation 24)}$$

Figure 4:
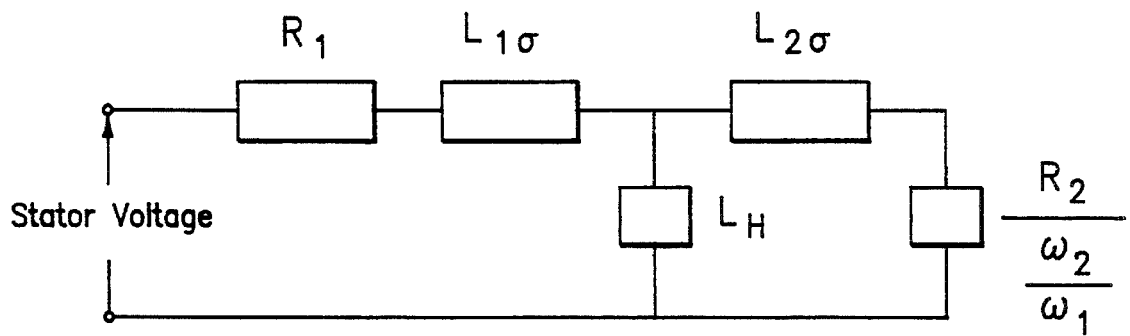
FIG. 4 is an induction motor equivalent circuit.

This model can be used to adjust the drive controller of an inverter controlled elevator. As shown in (23) and (24), there are four parameters used for a complete model description. These parameters are the stator resistance $R_1$, rotor time constant $\tau_2$, total leakage inductance $L_\sigma$ and the parameter $L_R$ which is not used in conventional models but can be derived from them. $L_R = L_H^2/R_2$, where LH is the main inductance and $R_2$ is the rotor resistance. The equivalent circuit is shown in FIG. 4.

The total leakage inductance $L_\sigma$ is identified by using an algorithm which is not a part of this invention but is described in "Self-Commissioning—A Novel Feature of Modern Inverter-Fed Induction Motor Drives," H. Schierling, Siemens AG, Federal Republic of Germany; and "Selbsteinstellendes and selbstanpassendes Antriebsregelsystem für die Asynchronmaschine mit Pulswechselrichter," H. Schierling, Dissertation 1987, pages 61–66, Technical University of Darmstadt, Federal Republic of Germany.

2. Identification of the Total Leakage Inductance $L_\sigma$

If in Equation (23) one set $i_{1a}=0$ and $\psi_{2a}'=0$, then the system of equations is reduced to:

$$L_\sigma di_{1a}/dt = u_{1a} \qquad \text{(Equation 25)}$$

Under these presuppositions it is therefore possible to calculate the total leakage inductance from the derivation of the current and the motor voltage. Now, in order to avoid the aforementioned errors of the pulse-controlled inverter in the low voltage range, the machine must be fed here with a high voltage in the range >100 V, so that the actually set voltage corresponds to the desired value. Since the current can then also rise very rapidly, the duration of the measurement is short, so that the condition $\psi_{2a}'=0$ is approximately fulfilled. In order to satisfy the other condition $i_{1a}=0$, the measurement is conducted at the zero crossing point of the current.

Figure 14:
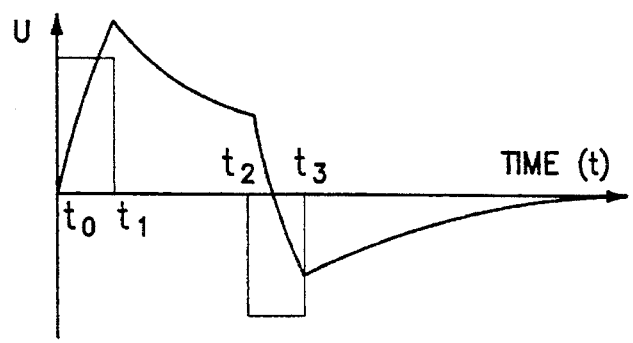
FIG. 14 is a graph of stator current and voltage waveforms used in the identification of an induction motor total leakage inductance $L_\sigma$.

A possibility for the practical realization of the measurement is the time course of the applied voltage and motor current resulting from it, as shown in FIG. 14.

At time $t_0$ a positive voltage is applied to the machine in the a direction. At time $t_1$ the current has reached a preset limit, which depends on the rated current of the motor and is limited $0.5I_{rated}$ for safety reasons. Then the voltage is lowered to 0 and the machine current discharges itself via the intermediate capacitor of the frequency converter. The voltage increase at the capacitor can be calculated from the energy absorbed:

absorbed energy of the machine: $E=0.5i^2L$ absorbed energy of the capacitor: $E=0.5(U+dU)^2C$ For a no-load intermediate circuit voltage U=540 V and a total leakage inductance of 30 mH maximum with the machines employed here and C=1 mF, a voltage rise Ud=2.78 V=0.5% results, which can be tolerated.

Then at time $t_2$, a negative voltage $U_a$ is applied to the machine. The current ia falls to another preset negative limit value. Then the voltage is set to zero again, the inductor discharges, and the identification of the total leakage inductance is finished.

Between times $t_2$ and $t_3$, the zero crossing point of the motor current is detected. For a certain time interval dt around this zero crossing point, the slope of the motor current is determined and from it the total leakage inductance:

$$L_{\sigma 4}=U_2 \, dt/di_2$$

This invention describes an identification algorithm to receive the remaining parameters $R_1$, $\tau_2$, and $L_R$. The algorithm works when all stator voltages and stator currents of the motor are in steady state. That the stator currents and voltages are steady state values can be assured by merely applying them and waiting a time expected to be sufficient for any transients to die out.

3. Identification of Remaining Parameters

A frequency converter offers the possibility of presetting the voltage phaser according to magnitude and orientation. An output frequency converter ac voltage $U_{1a}$ of frequency $\omega$, of the type required for the identification procedure, can thus be achieved by an appropriate variation of the rated voltage phaser fed to the frequency converter. Effects (minimal turn-on time, dead times) occurring in the frequency converter, however, lead to a phase shift of the fundamental wave of the actually set output voltage versus the required nominal value. At low voltages, this phase shift can reach 5°–10° for the frequency converter studied here. Thus, it is once again not possible to enlist the nominal voltage value as a reference for the identification.

One solution of the problem is to feed the machine with square-waves rather than the sinusoidal voltage $u_{1a}$, as is shown by FIG. 15.

A rectangular stator voltage ula as shown in FIG. 15 is supplied to the motor during standstill. The other stator voltage component $U_{1b}$ is set to zero so that the motor does not produce any torque and remains motionless. The stator voltage curve consists of a fundamental frequency $\omega$ and harmonic frequencies. $\omega$ can be derived from the period T: $\omega=2\pi/T$.

Figure 16:
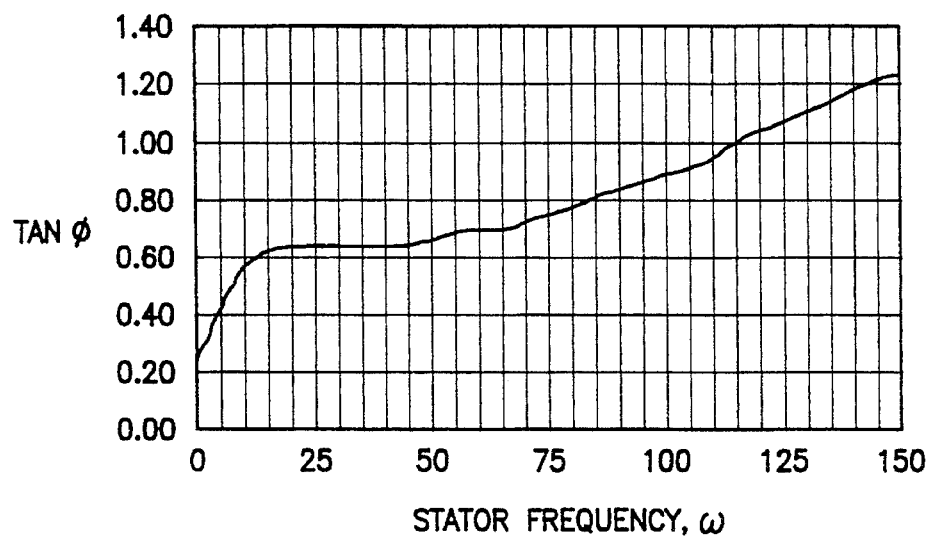
FIG. 16 is a graph of stator voltage used in the identification of rotor time constant $\hat{\tau}_2$, rotor resistance $R_1$, and a parameter $L_R$.
Figure 16:
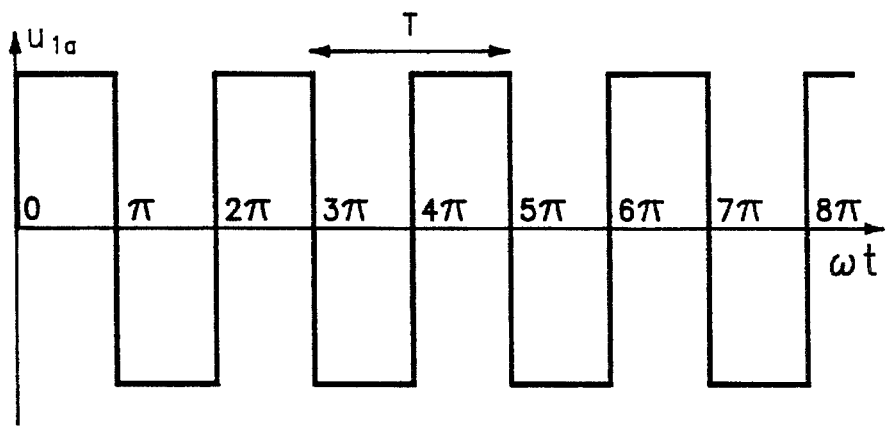
Figure 17:
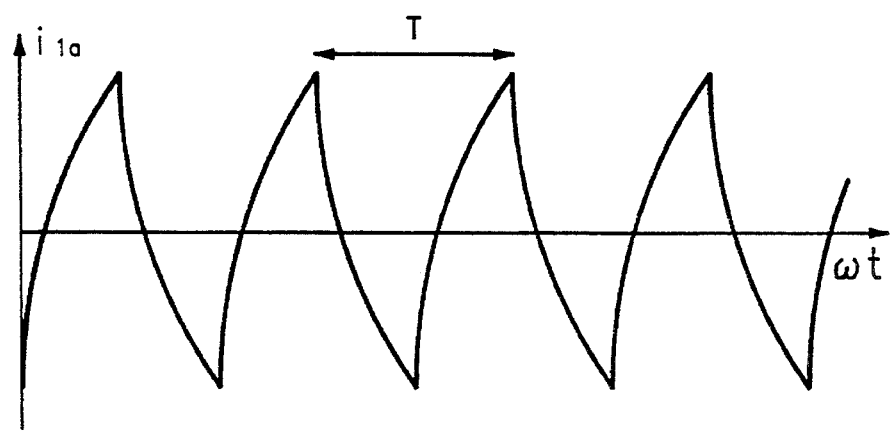
FIG. 17 is a graph of stator current used in the identification of rotor time constant $\tau_2$, rotor resistance $R_1$, and a parameter $L_R$.
Figure 18:
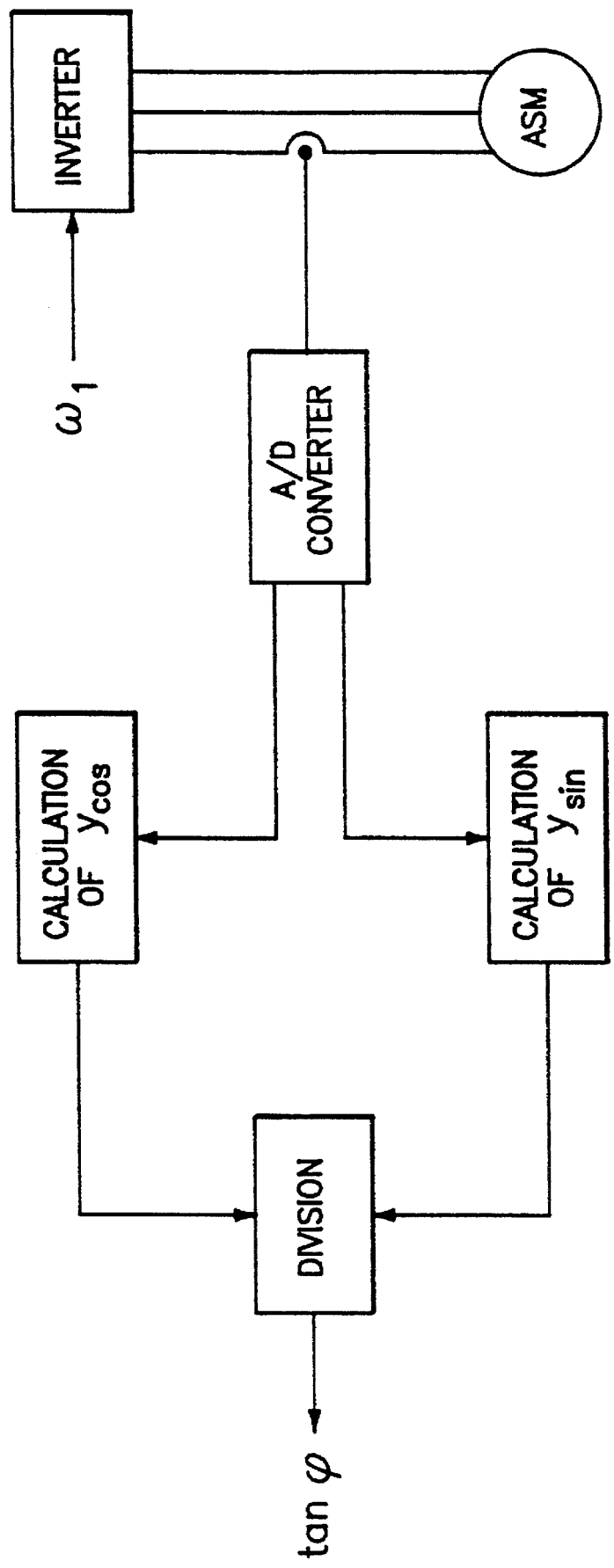
FIG. 18 is a block diagram of a circuit for getting tangent $\phi$.

FIG. 17 shows the motor stator current $i_{1a}$ which follows from the stator voltage $u_{1a}$ in FIG. 16. The curve of stator current $i_{1a}$ consists of increasing and decreasing exponential functions according to positive or negative $u_{1a}$.

FIG. 5 shows a part of the invention which computes tan $\phi$. The angle $\phi$ means the phase angle between the fundamental frequencies of motor stator voltage and stator current. Tan $\phi$ is used for further parts of the invention. An inverter (3) supplies the desired stator voltage with a fundamental frequency $\omega_1$ (4) to the induction motor (5). The stator voltage is the same as shown in FIG. 16. The motor stator current (6) is sampled during one period T with the help of an A/D converter (7) and then fed to block (8) and (9). Block (8) calculates a value Yc according to the equation.

$$y_c[k+1]=y_c[k]+i_{1a}[k] * \sin(2\pi k * t_{clock}/T) * t_{clock} \quad \text{(Equation 26)}$$

In this Equation (26) $i_{1a}[k]$ is a sampled value of $i_{1a}$. The next value sampled is $i_{1a}[k+1]$ and so on. The first value is $i_{1a}[0]$; the last value is $i_{1a}[T/t_{clock}-1]$. The output of block (8) is $y_{cos}$. It equals the last value of $y_c$:

$$y_{cos}=y_c[T/t_{clock}] \quad \text{(Equation 27)}$$

Thus, Equations (26) and (27) are the discrete form of the time continuous equation.

$$y_{cos}=\int_0^T i_{1a}(t)\sin(\omega t)dt = i_{fund}\pi\cos\phi \quad \text{(Equation 28)}$$

$i_{fund}$: amplitude of the fundamental frequency of $i_{1a}(t)$

The derivation of (28) is as follows:

Block (9) calculates a value $y_{sin}$ similar to the operation in block (8) (see Equations (26)–(28)):

$$y_s[k+1] = y_s[k] + i_{1a}[k] * \cos(2\pi k * t_{clock}/T) * t_{clock} \quad \text{(Equation 29)}$$

$$y_{sin} = y_s[T/t_{clock}] \quad \text{(Equation 30)}$$

$$y_{sin} = \int_0^T i_{1a}(t)\cos(\omega t)dt = i_{fund}\pi\sin\phi \quad \text{(Equation 31)}$$

(time continuous)

Block (16) contains a division. It computes tan $\phi$ according to: (Equation 32)

$$\tan\phi = \frac{y_{sin}}{y_{cos}} = \frac{i_{fund}\pi\sin\phi}{i_{fund}\pi\cos\phi} \quad \text{(Equation 33)}$$

See FIG. 6. The whole procedure is performed n times where n is the number of samples each time a stator voltage curve as described in FIG. 1 is fed to the motor. The value of the fundamental frequency $\omega$ is varied each time. So the result of all repetitions is a set of n pairs of the fundamental frequency $\omega$ and the appropriate value of tan $\phi$:

(Equation 34)

$$\text{Result} = \begin{pmatrix} \omega_1, & \tan\phi_1 \\ \omega_2, & \tan\phi_2 \\ & \cdot \\ & \cdot \\ & \cdot \\ \omega_n, & \tan\phi_n \end{pmatrix}$$

The following section of the disclosure shows the algorithm which estimates the missing motor parameters $R_1$, LR, $\tau_2$ by using the measured values $L_\sigma$ and (34). In case of steady state, a complex stator impedance $\underline{Z}(\omega)$ can be derived from the motor model (23) and (24):

$$\underline{u}_{1a}/i_{1a}=\underline{Z}(\omega)=R(\omega)+jX(\omega)=|\underline{Z}(\omega)|e^{-j\phi} \quad \text{(Equation 35)}$$

The real and imaginary components of impedance $\underline{Z}(\omega)$ are as follows:

$$R(\omega) = R_1 + \omega^2 L_R/N(\omega)$$
$$X(\omega) = \omega L_\sigma + \omega L_R/(T_2 N(\omega))$$
with
$$N(\omega) = 1 + \omega^2 T_2^2$$
$$\underline{Z}(\omega) = |\underline{Z}(\omega)|e^{-j\phi}$$
$$=> \underline{Z}(\omega)e^{j\phi} = |\underline{Z}(\omega)|$$
$$=> Im\{\underline{Z}(\omega)e^{j\phi}\} = 0$$

Additional transformations yield:

$$Im\{R(\omega) + jX(\omega)\} (\cos\phi + j\sin\phi) = 0 \ | :\cos\phi$$
$$Im\{R(\omega) + jX(\omega)\}(1 + j\tan\phi)\} = 0$$
$$=> R(\omega) \tan\phi + X(\omega) = 0$$

The imaginary part of the impedance's amount $|\underline{Z}(\omega)|$ equals zero (the amount is a real number):

$$Im(\underline{Z}(\omega)1)=Im(\underline{Z}(\omega)e^{j\phi})=0 \quad \text{(Equation 36)}$$

Equation (35) is now inserted into (36) and $R(\omega)$ and $X(\omega)$ are replaced by the parameters of (23) and (24): The result is the non-linear equation $$R(\omega) \tan\phi+x(\omega)=(\tan\phi), R_1\tau_2^2+L_R)+\omega^3 L_\sigma\tau_2^2 +\omega L_R/\tau_2+\omega L_\sigma=0$$

(Equation 37)

This Equation (37) is obtained as follows:
(SEE PAGES 27 AND 28)

$$\left. \begin{array}{l} L_\sigma \dfrac{di_{1a}}{dt} = -\left(R_1 + \dfrac{L_R}{\tau_2^2}\right) i_{na} + \dfrac{1}{\tau_2} \psi_{2a}' + u_{1a} \\ \dfrac{d\psi_{2a}'}{dt} = \dfrac{L_R}{\tau_2^2} i_{1a} - \dfrac{1}{\tau_2} \psi_{2a}' \end{array} \right\} \quad (1)$$

Substitution $\dfrac{d}{dt} \rightarrow j\omega$ $$\left. \begin{array}{l} ① \quad L_\sigma j\omega i_{1a} = -\left(R_1 + \dfrac{L_R}{\tau_2^2}\right) i_{1a} + \dfrac{1}{\tau_2} \psi_{2a}' + u_{1a} \\ ② \quad j\omega\psi_{2a}' = \dfrac{L_R}{\tau_2^2} i_{1a} - \dfrac{1}{\tau_2} \psi_{2a}' \end{array} \right\} \quad (1)$$

② $\to$ $\left(j\omega + \dfrac{1}{\tau_2}\right) \psi_{2a}' = \dfrac{L_R}{\tau_2^2} i_{1a}$ ② $\to$ $\boxed{\psi_{2a}' = \dfrac{L_R}{j\omega\tau_2^2 + \tau_2} i_{1a}}$ ③

③ $\to$ $jL_\sigma\omega i_{1a} = -\left(R_1 + \dfrac{L_R}{\tau_2^2}\right) i_{1a} +$ $$\dfrac{L_R}{j\omega\tau_2^3 + \tau_2^2} i_{1a} + u_{1a}$$

$$i_{1a} \left( j\omega L_\sigma + R_1 + \dfrac{L_R}{\tau_2^2} - \dfrac{L_R}{j\omega\tau_2^3 + \tau_2^2} \right) = u_{1a}$$

$$i_{1a} \left( j\omega L_\sigma + R_1 + \dfrac{L_R}{\tau_2^2} - \dfrac{L_R(1 - j\omega\tau_2)}{\tau_2^2(1 + \omega^2\tau_2^2)} \right) = u_{1a}$$

$$i_{1a} \left( R_1 + \dfrac{L_R}{\tau_2^2} - \dfrac{L_R}{\tau_2^2(1 + \omega^2\tau_2^2)} + \right.$$

$$\left. j\left(\omega L_\sigma + \dfrac{\omega L_R}{\tau_2(1 + \omega^2\tau_2^2)}\right) \right) = u_{1a}$$

$$i_{1a} \left( R_1 + \dfrac{L_R(1 + \omega^2\tau_2^2) - L_R}{\tau_2^2(1 + \omega^2\tau_2^2)} + \right.$$

$$\left. j\left(\omega L_\sigma + \dfrac{\omega L_R}{\tau_2(1 + \omega^2\tau_2^2)}\right) \right) = u_{1a}$$

$$i_{1a} \left( \underbrace{R_1 + \dfrac{\omega^2 L_R}{1 + \omega^2\tau_2^2}}_{=R(\omega)} + j\underbrace{\left(\omega L_\sigma + \dfrac{\omega L_R}{\tau_2(1 + \omega^2\tau_2^2)}\right)}_{=X(\omega)} \right) = u_{1a}$$

Substitute $R(\omega)$ and $X(\omega)$ in Equation 37:

(37): $R(\omega) \cdot \tan\phi + X(\omega) = 0$ $$R(\omega) = R_1 + \dfrac{\omega^2 L_R}{1 + \omega^2\tau_2^2} \quad iX(\omega) = \omega L_\sigma + \dfrac{\omega L_R}{\tau_2(1 + \omega^2\tau_2^2)}$$

$$R_1\tan\phi + \dfrac{\omega^2 L_R}{1 + \omega^2\tau_2^2} \tan\phi + \omega L_\sigma +$$

$$\dfrac{\omega L_R}{\tau_2(1 + \omega^2\tau_2^2)} = 0 / \times (1 + \omega^2\tau_2^2)$$

$$R_1\tan\phi(1 + \omega^2\tau_2^2) + \omega^2 L_R\tan\phi +$$

$$\omega L_\sigma(1 + \omega^2\tau_2^2) + \omega L_R/\tau_2 = 0$$

$$R_1\tan\phi + \omega^2\tau_2^2 R_1\tan\phi + \omega^2 L_R\tan\phi +$$

$$\omega L_\sigma + \omega^3\tau_2^2 L_\sigma + \omega L_R/\tau_2 = 0$$

$$\boxed{R_1\tan\phi + \omega^2\tan\phi(R_1\tau_2^2 + L_R) + \omega^3 L_\sigma\tau_2^2 + \omega \dfrac{L_R}{\tau_2} + \omega L_\sigma = 0}$$

This is Equation 37.

This equation can be written for the n working points in (34). The result is the following set of n non-linear equations (38):

$$f(R_1, L_R, \tau_2) = \left\{ \begin{array}{l} (\tan \phi_1) R_1 + \omega_1^2 (\tan \phi_1)(R_1\tau_2^2 + L_R) + \omega_1^3 L_\sigma \tau_2^2 + \omega_1 L_R/\tau_2 + \omega_1 L_\sigma \\ (\tan \phi_2) R_1 + \omega_1^2 (\tan \phi_2)(R_1\tau_2^2 + L_R) + \omega_2^3 L_\sigma \tau_2^2 + \omega_2 L_R/\tau_2 + \omega_2 L_\sigma \\ \vdots \\ (\tan \phi_n) R_1 + \omega_n^2 (\tan \phi_n)(R_1\tau_2^2 + L_R) + \omega_n^3 L_\sigma \tau_2^2 + \omega_n L_R/\tau_2 + \omega_n L_\sigma \end{array} \right\} = \begin{pmatrix} 0 \\ 0 \\ \cdot \\ \cdot \\ 0 \end{pmatrix}$$

(Equation 38)

In this equation set (38), the parameters $L_\sigma$, $\tan \phi$ and $\omega$ are known and the parameters $R_1$, $L_R$ and $\tau_2$ are missing. The missing parameters have to fulfill Equation (38). In practice, it is not possible to reach the condition (38) $f(R_1, L_R, \tau_2)=0$ exactly because of measuring errors of $L_\sigma$ and $\tan \phi$. It is not only measurement interference which plays a part here, but also the omissions made in setting up the machine model. Therefore, the missing parameters should not fulfill (38) exactly; rather, they should approximate it. A criterion for a good approximation is the minimization of the square of $f(R_1, L_R, \tau_2)$ (least squares method):

$$h(R_1, L_R, \tau_2) = 0.5 * (f(R_1, L_R, \tau_2))^T * f(R_1, L_R, \tau_2) = \text{Minimum}$$

(Equation 39)

The least squares method gives an iteration instruction to calculate a new parameter set $(R_1, L_R, \tau_2)[k+1]$ out of the last parameter set $(R_1, L_R, \tau_2)[k]$. The algorithm converges upon the missing parameters $R_1, L_R, \tau_2$ if the estimated start value $(R_1, L_R, \tau_2)[0]$ is a sufficiently good approximation of $R_1, L_R, \tau_2$.

The parameters are supplied to an elevator motor drive, FIG. 6. For a vector control, the rotor time constant is supplied to a velocity control.

Various modifications may be made to the above description without departing from the spirit and scope of the present invention.

We claim:

1. A method for providing an estimated rotor time constant of an induction machine, operated by a vector control, for driving an elevator, comprising:
   running the elevator up while empty and sampling an acceleration reference and a torque current reference provided by said vector control;
   running the elevator down while empty and sampling said acceleration reference and said torque current reference;
   determining the slope of a linear relationship between said sampled acceleration references and said sampled torque current references;
   subtracting said slope from an ideal slope associated with the actual rotor time constant of said machine and providing a difference signal;
   providing said estimated rotor time constant in response to said difference signal; and
   controlling an output torque of said induction machine by providing said estimated motor time constant to said vector control of said induction machine.

2. The method of claim 1, wherein said ideal slope is associated with said actual rotor time constant because said ideal slope is the value of said slope when the elevator drive is responsive to the actual value of the rotor time constant.

3. A method for providing an estimated rotor time constant of an induction machine of an elevator drive, operated by a vector control, comprising:
   providing a torque reference command to said vector control;
   measuring the motor torque resulting from operating said machine in response to said torque current reference;
   providing a signal indicative of the the difference between a slope of a linear relationship between said measured motor torque and said torque reference command from an ideal slope of a linear relationship between motor torque and torque reference command associated with the actual rotor time constant of said machine;
   providing said estimated rotor time constant in response to said signal; and
   controlling said output torque of said induction machine by providing said estimated motor time constant to vector control of said induction machine.

4. The method of claim 1 wherein said torque reference command is provided approximately by a torque current reference command.

5. The method of claim 3 wherein said torque reference command is provided approximately by a torque current reference command.

6. The method of claim 1 wherein said reference command torque is provided approximately in response an acceleration reference and the sign of a load torque.

7. The method of claim 3 wherein said motor torque is provided approximately in response an acceleration reference and the sign of a load torque.

8. The method of claim 1 wherein said ideal slope is determined when there is no load on the induction machine.

9. The method of claim 3 wherein said ideal slope is determined when there is no load on the induction machine.

10. The method of claim 3 wherein said ideal slope is associated with said actual rotor time constant because said ideal slope is the value of said slope when the elevator drive is responsive to the actual value of the rotor time constant.

11. The method of claim 1 wherein said signal has one value when the load torque is greater than zero and another value when the load torque is less than zero.

12. The method of claim 3 wherein said signal has one value when the load torque is greater than zero and another value when the load torque is less than zero.

13. The method of claim 1, wherein said ideal slope is a slope of one.

14. The method of claim 3, wherein said ideal slope is a slope of one.

* * * * *